April 23, 1946. S. W. McDOUGALL Re. 22,746
MINER'S DRILL CARRIAGE
Original Filed Dec. 23, 1940 3 Sheets-Sheet 1
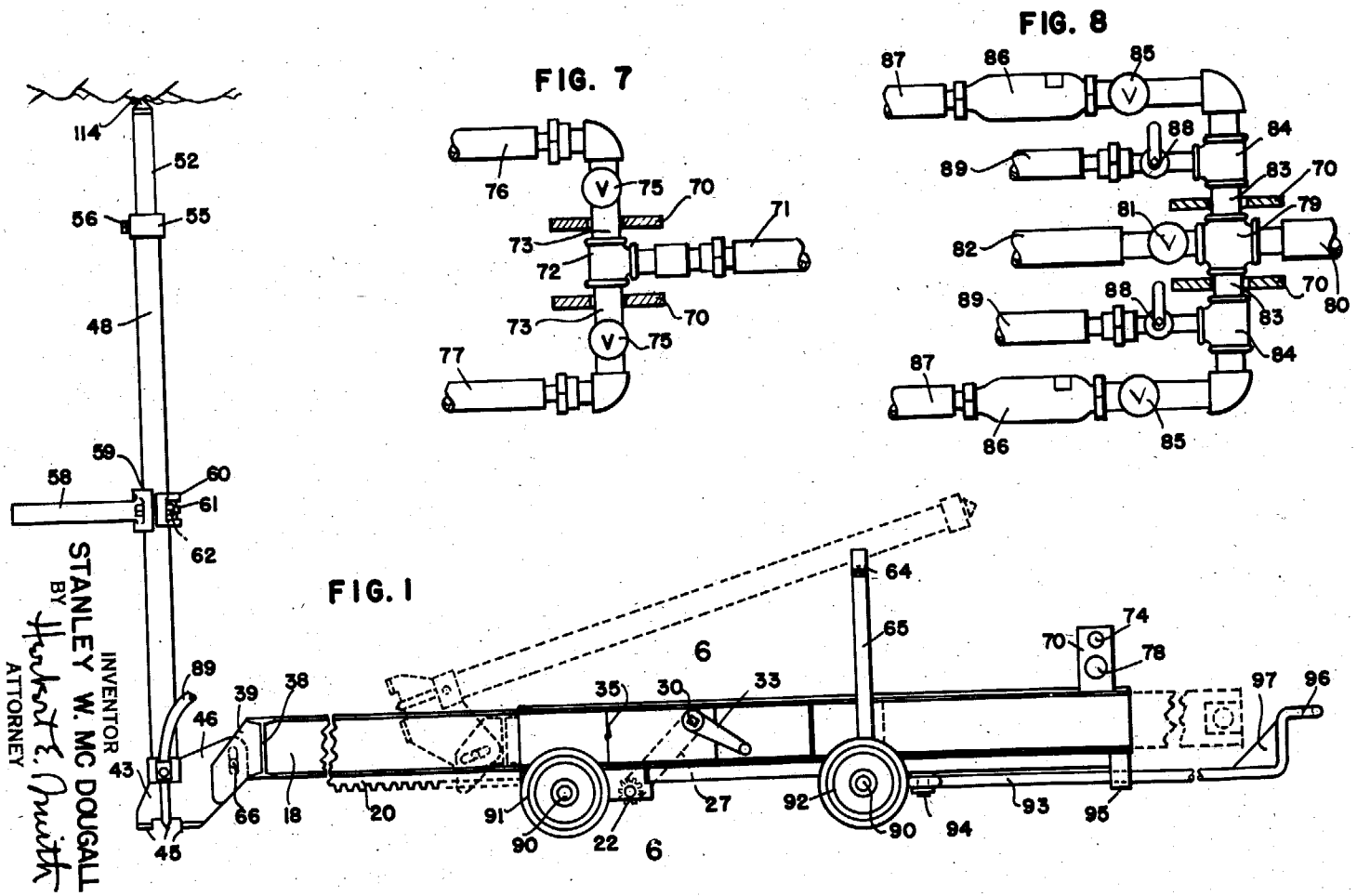
INVENTOR
STANLEY W. MC DOUGALL
BY Herbert E. Smith
ATTORNEY April 23, 1946. S. W. McDOUGALL Re. 22,746
MINER'S DRILL CARRIAGE
Original Filed Dec. 23, 1940 3 Sheets-Sheet 2
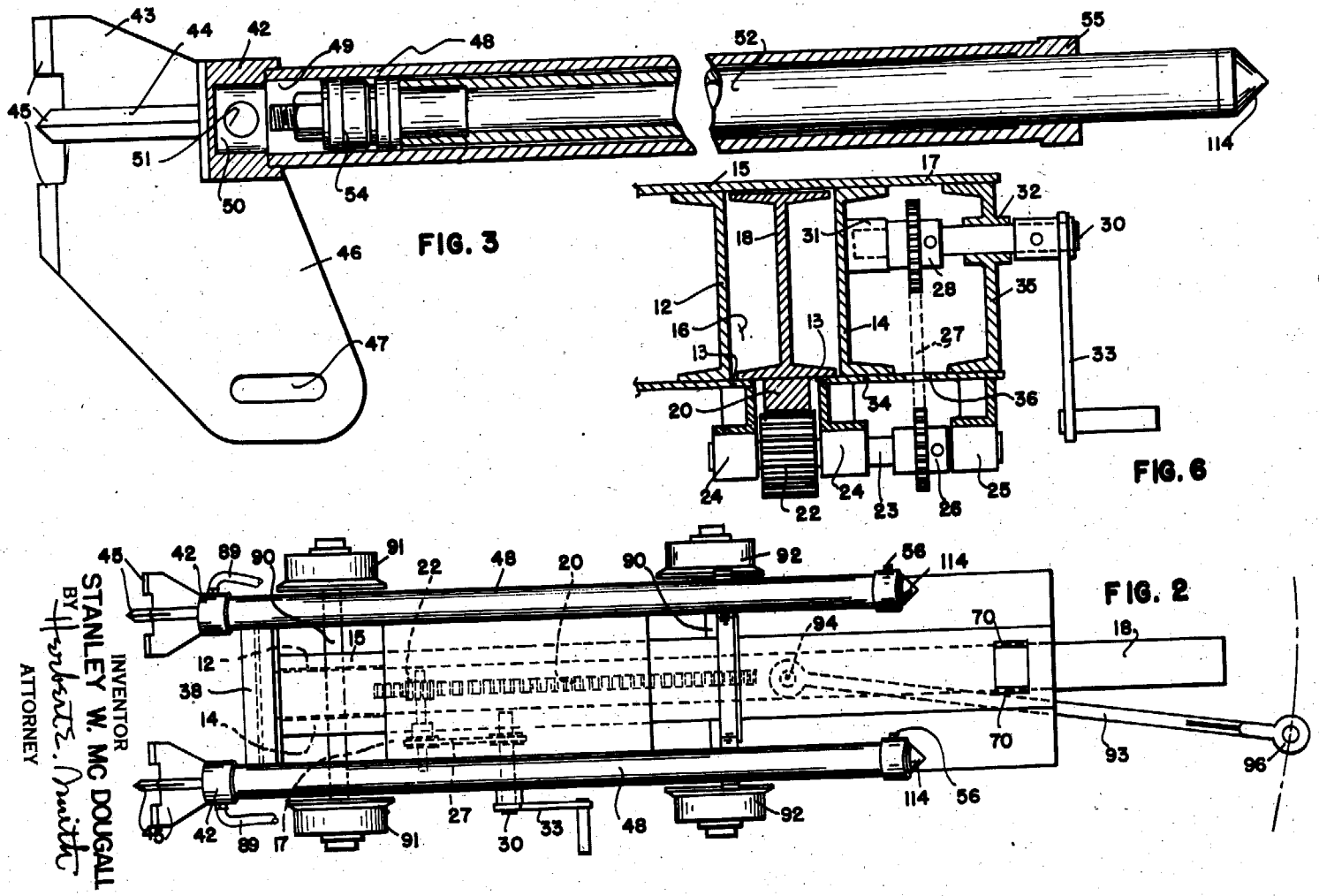
INVENTOR
STANLEY W. MC DOUGALL
BY Herbert E. Smith
ATTORNEY April 23, 1946. S. W. McDOUGALL Re. 22,746

MINER'S DRILL CARRIAGE

Original Filed Dec. 23, 1940 3 Sheets-Sheet 3

INVENTOR
STANLEY W. MC DOUGALL
BY Herbert E. Smith
ATTORNEY

Reissued Apr. 23, 1946

Re. 22,746

UNITED STATES PATENT OFFICE 22,746

MINER'S DRILL CARRIAGE

Stanley W. McDougall, Kellogg, Idaho, assignor of one-third to John Fox, Kellogg, Idaho, and one-third to Roy S. Hooper, Kellogg, Idaho Original No. 2,312,660, dated March 2, 1943, Serial No. 371,265, December 23, 1940. Application for reissue November 24, 1944, Serial No. 564,948

3 Claims. (Cl. 255—51)

Figure 4:
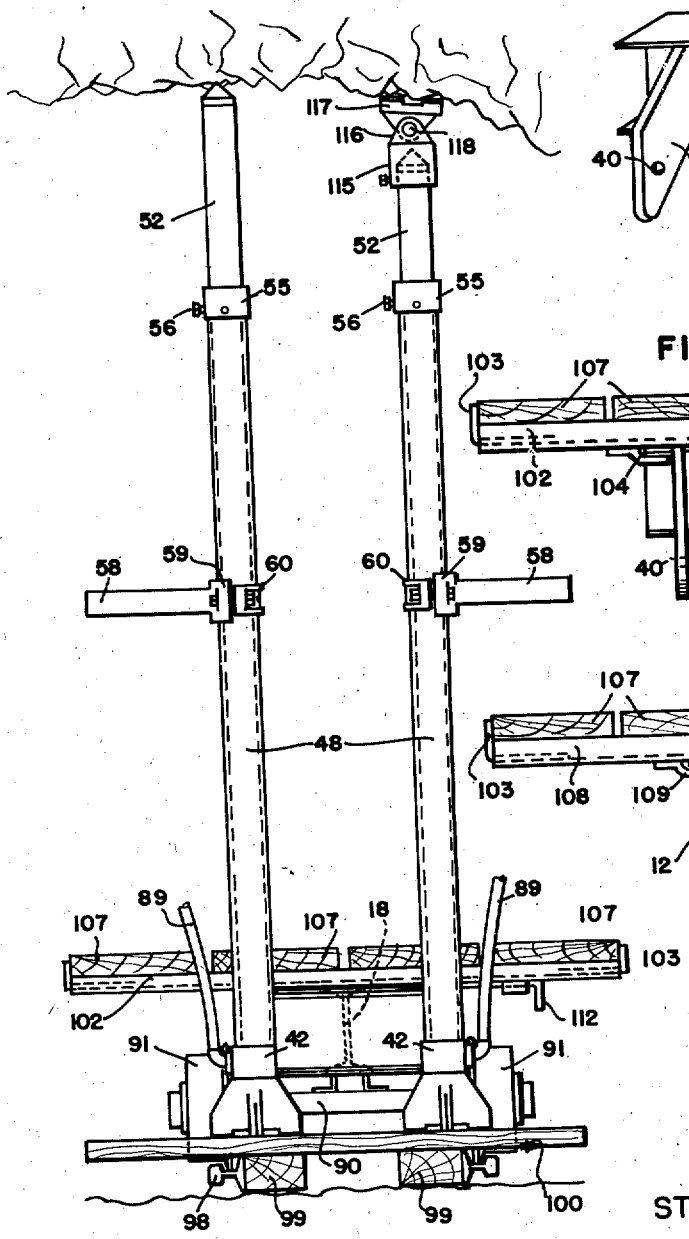

This invention relates to improvements in a miner's drill carriage adaptable for use in connection with drilling operations in tunneling or drifting in underground mines or for other uses of a similar nature.

According to mining practices, it is customary in drifting or extending a tunnel to carry into the heading of the tunnel-suitable drill machinery, hoses for conducting air and water to the point of operation, tool columns or support bars for the drilling machine and adjustable cross arms or laterally extending tool arms upon which, on occasion, the machine may be mounted. Also, the necessary incidental tools and drill steel to be used at the heading must be carried into the heading. The support bars are usually first set up and then they may have their cross arms or lateral bars attached thereto. The drill is next positioned and directed according to the hole to be drilled. All of this equipment is necessarily heavy in order to withstand the hard use to which it is subjected in operation, as well as due to the fact that much of it is complicated machinery.

When the drilling equipment is set up and operated, a round of holes is drilled according to a predetermined pattern in the face of the heading or tunnel end. Upon the completion of this drilling operation the equipment must be disassembled and removed back down the tunnel a sufficient distance to place it out of the danger zone at the tunnel face when the round of holes has been charged with blasting powder or dynamite and shot. This means that the machine and other materials should be removed about three hundred and fifty feet back or to a siding where there is no danger of damage when the blast is set off.

After the heading has been blasted and the rock or ore thus loosened has been mucked out, the drillers again return to the heading and drill another round of holes.

Carriages are used to carry the machinery in and out of the tunnel in order to make the work as easy as possible. These carriages are of limited usefulness due to the fact that they are nothing more than four-wheeled cars. With these present objections to the available equipment in mind, a primary object of my invention has been to devise a carriage for use by miners or tunnelers to facilitate the drilling operation at the headings by having associated therewith as a standard part thereof tool columns adapted to be positioned adjacent the tunnel face for mounting the conventional pneumatic drilling or other form of machinery employed in mining operations.

Another object of my invention has been to provide in a carriage having associated therewith pneumatically operated tool columns having expansible means for accurately and quickly securing the bars in an upright adjusted position for the ready attachment thereto of the drilling machinery.

A further object of my invention has been to provide in a carriage, means for pivotally mounting drilling machine support columns so that they may be placed in a reclining position during periods of non-use.

Still another object of my invention has been the provision in a miner's carriage of tool support bars mounted thereon and having a limited adjustability so that they may be readily accommodated to various tunnel conditions such as uneven floors and the like.

A still further object of my invention has been to provide in a carriage extensible means for mounting the tool columns, which means may be retracted into the carriage during periods of non-use, and extended outward therefrom to position the tool columns or tool support bars a considerable distance ahead of and away from the carriage.

Additionally it is an object of my invention to provide a device of the nature set forth in the foregoing objects, which device is capable of being built up in standard structural shape for ease and simplicity of manufacture and which device comprises a relatively limited number of parts in order that the cost of manufacture may be kept as low as possible.

Still another and further object of my invention has been to incorporate all of the foregoing and other objects into a single device capable of withstanding hard rugged use and also at all times being capable of operation under the most adverse conditions.

Other advantages of my invention will be apparent during a study of the accompanying drawings and during the course of a reading of the following description wherein is illustrated and described a preferred form of my invention.

Figure 5:
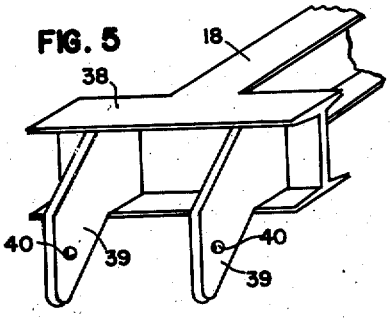
Figure 9:
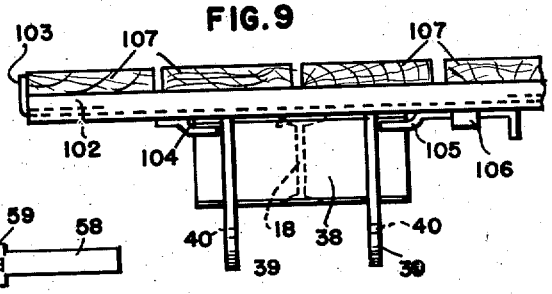
Figure 10:
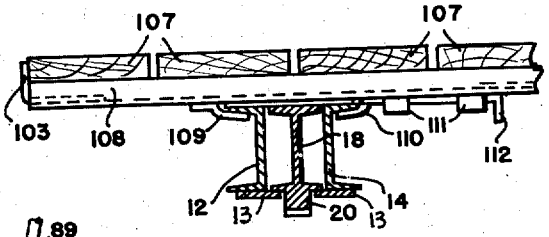

In the accompanying drawings:

Figure 1 is a side elevational view of the carriage according to the principles of my invention, showing in full and in dotted lines the erect and reclining positions, respectively, of the drill supporting column employed for mounting drilling machinery or the like, Figure 2 is a plan view of my miner's carriage illustrating the general arrangement of parts during such time that the drill supporting bars are placed in a reclining position, Figure 3 is a medial sectional view taken longitudinally of a drill supporting column and illustrating the pneumatically operated means whereby it may be extended when being placed in an adjusted position, Figure 4 is an end elevational view as though taken of a carriage positioned in a tunnel heading with the tool columns placed in the erect position ready for the reception of the drilling machinery to be mounted thereon, Figure 5 is a fragmentary perspective view of the outboard end of the tool column mounting member which is extended from or retracted to the carriage, Figure 6 is a sectional view taken on line 6—6 of Figure 1, illustrating in detail means whereby the extensible rail of the carriage is caused to move to extended or retracted position, Figure 7 is a plan view of a water manifold employed in connection with my carriage, Figure 8 is a plan view of an air manifold employed in connection with my carriage, Figure 9 is a detail view illustrating the manner in which a working platform may be provided on the column mount for the drillers, and Figure 10 is a similar view, partially in section, illustrating the manner in which the working platform is mounted on the carriage.

In the drawings like reference numerals indicate like parts throughout the same.

My carriage comprises a pair of longitudinal structural frame members 12 and 14, which are shown in the drawings to be channel irons positioned on their flanges in vertical manner, spaced apart from each other and tied together across the top by means of the table plate 15. The members 12 and 14 are spaced apart to provide a slideway 16 between the inner faces of the webs of the channel irons. On the lower portion of members 12 and 14 I provide slide lips or flanges 13, 13. Into slideway 16 is fitted the slide rail member 18 herein shown to be an I-beam, having its lower flanges resting on the lip 13, 13.

The member 18 is adapted to be extensibly or retractably moved in the slideway 16 through the instrumentality of the rack 20, secured on the bottom face of member 18, and which in Figure 6 is shown to extend downwardly below the lower face of the members 12 and 14. A pinion 22 engages in the teeth of the rack. The pinion 22 is keyed for rotation on the shaft 23, and shaft 23 is in turn mounted in bearings 24, 24 as well as in the outboard bearing 25. A driven sprocket 26 is keyed to the shaft 23 and by means of the chain 27 which encircles the drive sprocket 28, shaft 23 is caused to rotate.

As may be seen in Figure 6, the sprocket 28 is keyed on shaft 30, which in turn is journalled in the inner thrust bearing 31 and the outboard bearing 32. Shaft 30 is caused to rotate through the instrumentality of the crank 33.

In the showing of Figure 6 the plate 15 is extended at 17 and the lower auxiliary plate 34 is also provided to attach the structural member 35 in substantially parallel relation alongside of the member 14 and spaced apart in relation thereto. In this way the operating sprockets and chains driving the pinion 22 is enclosed. The chain passes downwardly through the opening 36 in the plate 34.

In the drawings I have shown mounted on my carriage a pair of expansible tool columns or support bars. It will be understood that one, two or more could be used as occasion may arise.

On the outer end of the rail member 18 I provide the cross head 38 herein shown to be an I-beam, which has the forwardly projecting ears 39, 39. In each ear I provide a pivot hole 40 for a purpose later to be described.

The expansible support bar comprises the terminal collar 42 having mounted thereon the radially arranged foot flanges 43 and 44. In Figure 3 the flanges are shown as having sharp edges 45 to facilitate their engagement on the ground surface or supporting blocks. One of the flanges is extended, as shown at 46, to provide a pivot ear for association with the ears 39 of the crosshead 38. The ear 46 has the elongated pivot slot 47.

To the cap member 42 I attach the tube 48 which forms the pneumatic chamber 49. Chamber 49 is connected with the adit chamber 50 of the collar 42 and an air inlet opening 51 is provided in a wall of the member 42.

The extension bar 52 is fitted within the chamber 49 and has the piston 54 provided with sealing means at one end so that when air is introduced into the chamber 49 the bar 52 will be extruded therefrom. A suitable guide bearing 55 on the upper end of the casing 48 properly aligns the member 52 therein. The screws 56 are for locking the bar 52 in adjusted position when it is desired that such a lock be used.

A laterally disposed drill supporting bar 58 is shown in Figure 1 as having on one end the clamp segment 59. A co-operating clamp segment 60 is secured thereon by means of the bolts 61 and nut 62. Bar 58 may be adjustably secured in any desired position along the length of the support bar member 48, and also in any radial direction therefrom for the proper positioning of a rock drill during the drilling operation.

To facilitate the support of the tool columns during periods of non-use, saddles 64 are employed and mounted on the legs 65 above the upper surface of the carriage. When the columns 48 are laid over to the dotted line position of Figure 1, they will be supported at an angle upon the carriage.

The pivot pin 66 passes through the hole 40 and slot 47 to pivotally attach the members 46 to the ears 39.

On the rear end of the carriage, I mount a pair of upstanding plates 70 for supporting the manifolds through which water and air are distributed to the pneumatically extensible tool columns as well as to the drilling machines.

In Figure 7 I have shown a water hose 71 introduced between the plates 70 and connected to the standard T 72. Nipples 73 extend outward from either side of the T, pass through opening 74 in the plates 70 and are in turn connected to valve members 75, 75. By means of standard elbows and pipe fittings, right angular bends are formed and a pair of water hoses 76 and 77 are arranged for connection to the drilling machines.

Disposed in holes 78, below the holes 74, in plates 70, is a four-way piping connection 79 to which is fastened the air hose 80. Opposite the hose 80 is located the valve 81 and an auxiliary air hose 82 which is led forwardly and may be employed by the driller in blowing dust, rock cuttings and the like out of the drilled holes.

Extending outwardly on either side of member 79, are nipples 83 which pass through the holes 78 and are attached to the pipe T's 84, 84.

From T 84, by means of an elbow, air is led through the valve 85, 85, thence to the drilling machine oilers 86, 86 and subsequently to the air lines 87, 87 for connection with the drilling machine. Also associated with the T members 84 are the manually operated valves 88 which communicate air to the air hoses 89, 89, which, in their forward extensions, are connected to the adit chambers 50, 50 of the support bars 48, by means of opening 51.

Air introduced through the tubes or hose 80 passes to the air line 89 and when the valves 88 are open, the member 52, of the support bars, will be caused to extrude from the chamber 49 to engage the ceiling of a tunnel or drift in the manner indicated in Figure 1.

By means of axles 90, I mount pairs of wheels 91, 91 and 92, 92 below the carriage. The wheels are spaced apart a sufficient distance to roll upon the usual car track which is used in tunnelling.

A swingingly mounted draw bar 93 is pivoted at 94 to the carriage, and passes forwardly through the guide loop 95. A draft loop 96 is provided on the forward end and is offset from the main axis of the member 93 and a web brace 97 is shown to maintain the loop 96 in its offset relationship to the draw bar.

When it is desired to extend the machine or to roll the machine past the end of the conventionally laid track steel, horizontally disposed, slide rails 98 (see Fig. 4) may be disposed inside of the upright or upstanding rails. Such slide rails will usually have secured thereon the footing blocks 99. Then when the carriage rolls off of the ball of the standard upright rail, the flange rolls onto the web of the slide rails which are lying sideways. In this way the necessity for a temporary setup of permanently laid standard track is eliminated.

For properly seating the radially flanged bases of the tool columns, when they are in upright position, a cross plank 100 may be used upon the block 99.

Under certain conditions it is desirable that the drill team be provided with a working platform adjacent the drill equipment and above the floor of the tunnel. To facilitate the attaching of such a platform, I provide a cross channel 102 having outer upturned ends 103 adapted to rest on the member 38. A forked clip 104 engages over the end of the web of the I-beam 38. When the cross bar 102 is placed in position as shown in Figure 9 the planks 107 may be laid on the working form.

In a similar manner the cross rail 108 is attached to the flanges of the channel members 12 and 14 by means of the fixed clip 109 and the sliding clip 110, slidable in loop 111 and which may be set in place by means of latch handle 112.

When the carriage is rolled into the tunnel and up to the heading, normally the tool mounting columns 48, carrying the drill machines, are reclined as indicated in Figure 1. The air hoses and water hoses from the manifold of Figure 7 and Figure 8 are connected and the slack piled on the carriage, as well as the other incidental tools employed by the workmen.

An electric locomotive may attach itself to the draftlink 96 and push the carriage ahead of it along the tunnel track and onto the extension track.

When the carriage is positioned so that the members 48 comprising the machine support bars are located they may be raised and extended to the proper position for the drilling operations as determined by the operator, the locomotive can be disconnected and will withdraw from the scene of operations.

At such time as the columns are to be placed in the erect position, foot blocking is arranged on the floor of the tunnel, somewhat after the showing of Figure 4. This adjustment of the footings of the columns on the blocks is facilitated through the coaction of the slot 47 on the member 46 with the pivot pin whereby the column may assume a vertically raised or lowered position within the limits of the slot 47 to accommodate varying heights of footing or foot blocking.

When the column is properly erected on its foot support, air is introduced into the chambers 49 of either of the columns by turning the proper valve 88 on the air manifold. The piston and the tube 52 are extended outwardly from the casing 48 until contact is made with the ceiling of the tunnel.

In the device of Figure 3, and elsewhere in the drawings, I have shown a contact point 114 on the tube 52 which is adapted to engage the rock of the ceiling and seat itself in a firm and rigid manner. Where the material of the ceiling of the tunnel is comparatively soft, I provide the adapter member shown on the right hand tool column of Figure 4. This device comprises a sleeve 115 having pivot ears 116. A foot member 117 is swingingly or pivotally mounted by means of the pin 118 on the ear 116 and when this foot contacts an uneven surface, such as the roof of a tunnel, it will conform itself to that surface through its swinging action on the sleeve 115 and do so without distorting the tube 52.

When the tool columns are rigidly positioned in a substantially vertical manner the lateral tool supports may be adjustably positioned along the length of the members 48, and in any desired direction therefrom for the directing of the drilling machines which will then be fixed for a hole to be drilled by use of suitable clamps.

When the support bars have been positioned and fixed for a drilling operation and it is desired to drill the upper holes of a round in the face of the wall, the platform may be placed on the carriage and the supports thereof locked in place. After the upper series of holes have been drilled the platform is then removed and laid aside, the crank 33 is then operated to retract the carriage to provide room for the machine operators to stand on the floor of the tunnel or working to drill the lower series of holes. To do this they lower the horizontal support bar 58 and with it the machine, and locate both to the desired position for their needs.

When the crank 33 is turned in the proper direction it operates the sprocket 28 and through the chain connection 27 the sprocket 26, which turns the shaft 23 and the pinion 22, which in turn operates on the rack 20 to retract the carriage as shown in Fig. 1.

While I have shown throughout the drawings, a carriage having a plurality of tool columns, it will be understood that a single column need only be used at any given time or even be provided on any particular machine. I have found, however, that in high speed tunneling operations, it is practical to use a pair or more of tool columns so that several drilling machines may be operated at one time. Thus the completion of the drilling of a round of blast holes will be more rapidly accomplished.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

Having thus fully described my invention, what I claim as new and desire to secure by Letters Patent is:

1. In a miner's drill carriage of the type having a frame supported by ground engaging members and carrying an extensible tool column, tool column attaching means, comprising: a bracket supported by said frame, an ear associated with said tool column at one end thereof and extending laterally therefrom for positioning adjacent said bracket, and a pin-and-slot pivotal coupling between said bracket and said ear whereby said column may have swinging and sliding movement of its longitudinal axis about said coupling but may not rotate about said longitudinal axis relative to said coupling.

2. In a miner's drill carriage of the type having a frame supported by ground engaging members and carrying a tool supporting column; tool column attaching means comprising, a connection member on said frame and adapted to be positioned in advance thereof, and a pivotal coupling between said member and said column whereby said column may have swinging movement of its longitudinal axis about said pivotal coupling between a lowered position over the frame and an upright position, said column having a supporting foot, at its base provided with means extending laterally toward the connecting member, said pivotal coupling including a pivot pin pivotally connecting said means to the connecting member, said means being movable with respect to the member, while the column is upright, to provide vertical adjustment of the column with respect to the frame.

3. In a miner's drill carriage of the type having a frame supported by ground engaging members and carrying an extensible tool column, tool column attaching means comprising; a connection member on said frame, and a horizontal pivotal coupling between said connection member and said column, including means preventing rotation of the column about its longitudinal axis, said column being mounted by said means to move a limited amount longitudinally of its axis with respect to said coupling.

STANLEY W. McDOUGALL.